(12) United States Patent
Kojima

(10) Patent No.: US 9,790,879 B2
(45) Date of Patent: Oct. 17, 2017

(54) CONTROLLER FOR STARTING VEHICULAR DIRECT-INJECTION ENGINE

(71) Applicant: Susumu Kojima, Susono (JP)

(72) Inventor: Susumu Kojima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 14/437,413

(22) PCT Filed: Nov. 1, 2012

(86) PCT No.: PCT/JP2012/078307
§ 371 (c)(1),
(2) Date: Apr. 21, 2015

(87) PCT Pub. No.: WO2014/068746
PCT Pub. Date: May 8, 2014

(65) Prior Publication Data
US 2015/0275797 A1   Oct. 1, 2015

(51) Int. Cl.
| | |
|---|---|
| *F02D 41/06* | (2006.01) |
| *B60W 20/00* | (2016.01) |
| *B60K 6/48* | (2007.10) |
| *B60W 10/06* | (2006.01) |
| *F02N 11/08* | (2006.01) |

(Continued)

(52) U.S. Cl.
CPC ............. *F02D 41/062* (2013.01); *B60K 6/48* (2013.01); *B60W 10/06* (2013.01); *B60W 20/00* (2013.01); *B60W 20/40* (2013.01); *F02D 37/02* (2013.01); *F02N 11/08* (2013.01); *F02N 99/004* (2013.01); *F02N 99/006* (2013.01); *F02P 5/145* (2013.01); *F02P 15/08* (2013.01); *F02P 17/12* (2013.01); *B60Y 2400/426* (2013.01); *F02N 2019/008* (2013.01); *F02N 2300/2002* (2013.01); *Y02T 10/6221* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 2004/0200448 A1 | 10/2004 | Kojima et al. | |
| 2006/0196460 A1* | 9/2006 | Ohtsu | F02N 11/0814 123/179.3 |

(Continued)

FOREIGN PATENT DOCUMENTS

| | | |
|---|---|---|
| JP | 2004-028046 A | 1/2004 |
| JP | 2004-316455 A | 11/2004 |

*Primary Examiner* — Rami Khatib
*Assistant Examiner* — Nicholas K Wiltey
(74) *Attorney, Agent, or Firm* — Oliff PLC

(57) ABSTRACT

A start control device of a vehicular direct injection engine provided in a vehicle is configured to execute an ignition start to raise rotation of the direct injection engine at a start of the direct injection engine by fuel injection and multiple sparking performed for a predetermined cylinder in an expansion stroke out of multiple cylinders of the direct injection engine, the start control device of a vehicular direct injection engine reduces the number of times of sparking for the predetermined cylinder at the time of an ignition start of the direct injection engine as compared to an ignition start performed before the current ignition start based on ignition timing of the ignition start performed before the current ignition start.

6 Claims, 8 Drawing Sheets

(51) Int. Cl.
  *F02N 99/00* (2010.01)
  *F02P 15/08* (2006.01)
  *F02P 17/12* (2006.01)
  *B60W 20/40* (2016.01)
  *F02D 37/02* (2006.01)
  *F02P 5/145* (2006.01)
  *F02N 19/00* (2010.01)

(56) References Cited

U.S. PATENT DOCUMENTS

2009/0114188 A1\* 5/2009 Peters .................. F02D 35/025
  123/406.19
2010/0057327 A1\* 3/2010 Glugla .................. F02D 35/028
  701/103

\* cited by examiner

FIG.3

| PHASE(°) CYLINDER NO. | 0 | 90 | 180 | 270 | 360 | 450 | 540 | 720 | 0 | 90 | 180 | 270 | 360 |
|---|---|---|---|---|---|---|---|---|---|---|---|---|---|
| 1 | EXPLOSION | | EXHAUST | | INTAKE | | COMPRESSION | | EXPLOSION | | EXHAUST | | INTAKE |
| 8 | EXPLOSION | EXHAUST | | INTAKE | | COMPRESSION | | EXPLOSION | | EXHAUST | | INTAKE | COMPRESSION |
| 7 | EXHAUST | | INTAKE | | COMPRESSION | | EXPLOSION | | EXHAUST | | INTAKE | | COMPRESSION |
| 3 | EXHAUST | INTAKE | | COMPRESSION | | EXPLOSION | | EXHAUST | | INTAKE | | COMPRESSION | EXPLOSION |
| 6 | INTAKE | | COMPRESSION | | EXPLOSION | | EXHAUST | | INTAKE | | COMPRESSION | | EXPLOSION |
| 5 | INTAKE | COMPRESSION | | EXPLOSION | | EXHAUST | | INTAKE | | COMPRESSION | | EXPLOSION | EXHAUST |
| 4 | COMPRESSION | | EXPLOSION | | EXHAUST | | INTAKE | | COMPRESSION | | EXPLOSION | | EXHAUST |
| 2 | COMPRESSION | EXPLOSION | | EXHAUST | | INTAKE | | COMPRESSION | | EXPLOSION | | EXHAUST | INTAKE |

△ STOP AT TCD △ STOP AT 45° ATDC

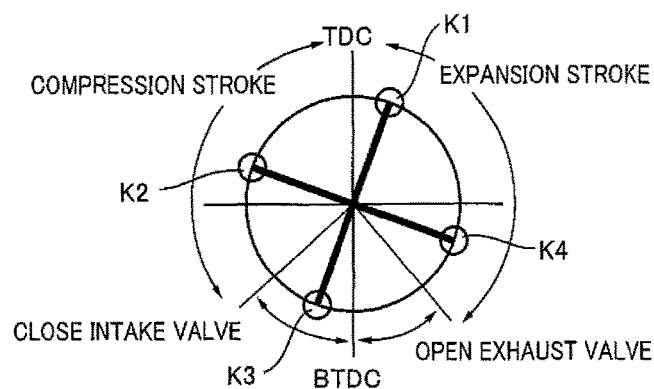

FIG.4

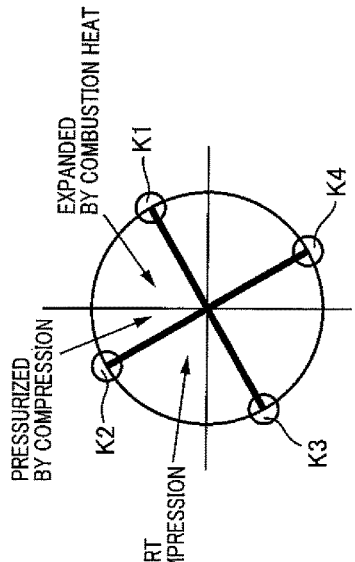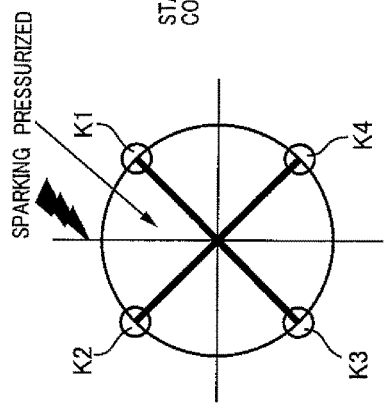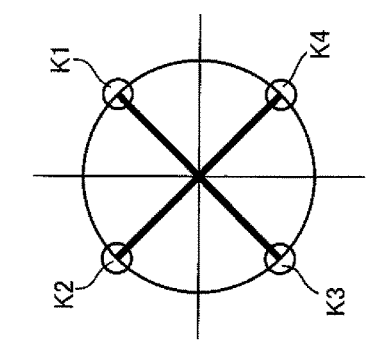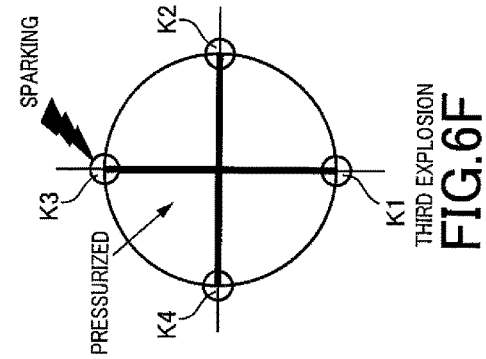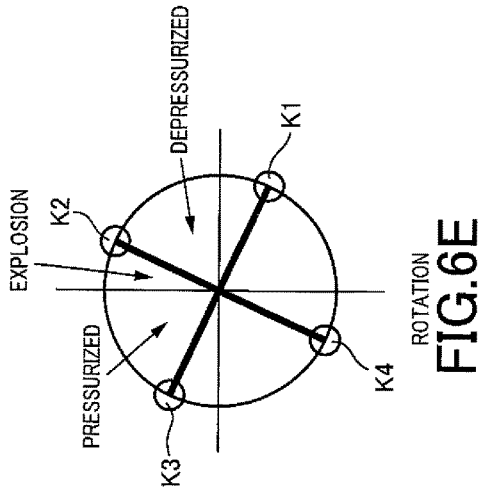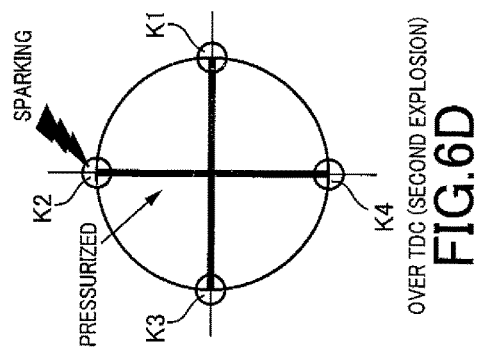

CONTROLLER FOR STARTING VEHICULAR DIRECT-INJECTION ENGINE

TECHNICAL FIELD

The present invention relates to a control device starting a direct injection engine capable of direct injection of fuel into a cylinder in a vehicle.

BACKGROUND ART

During running of a vehicle including a direct injection engine directly injecting fuel into a cylinder, an engine is repeatedly restarted in some cases. For example, this corresponds to a so-called idling reduction vehicle restarting a direct injection engine after the engine is automatically stopped each time the vehicle stops running for the purpose of fuel consumption saving, exhaust emission reduction, and noise reduction and to a hybrid vehicle restarting a direct injection engine in accordance with an increase in request output so as to make a shift from previous electric motor running to engine running. The direct injection engines in such vehicles use a so-called ignition start by injecting and sparking fuel in a cylinder in an expansion stroke out of multiple cylinders and the rotation of the direction injection engine is raised by utilizing a torque generated by explosion due to this sparking.

PRIOR ART DOCUMENT

Patent Document

Patent Document 1: Japanese Laid-Open Patent Publication No. 2004-028046

SUMMARY OF THE INVENTION

Problem to be Solved by the Invention

In Cited Document 1, when a direct injection engine is restarted, multiple sparking is performed by sparking a cylinder in an expansion stroke multiple times. In particular, the sparking in the cylinder in the compression stroke of the direct injection engine must be performed when a region of a combustible air-fuel ratio range formed by fuel injected from a fuel injection valve into an atomized or vaporized state and mixed with air passes through a sparking plug; however, a time required for atomization or vaporization of fuel and a time of flowing of the region of the combustible air-fuel ratio range to the sparking plug are not necessarily constant due to temperature etc., and sparking at optimum timing may not necessarily be achieved by one sparking. Therefore, in Cited Document 1, to reduce a probability of misfire and stably start the engine, the multiple sparking is employed by performing sparking multiple times from near an initial explosion position based on a predetermined crank angle equal to or greater than 15 degrees, for example.

However, the multiple sparking described in Cited Document 1 has a disadvantage that electric power consumption increases because the sparking is uniformly performed the constant number of times defined in advance every time an engine is started.

The present invention was conceived in view of the situations and it is therefore an object of the present invention to provide a start control device of a vehicle direct injection engine reducing the number of times of sparking at a start of a direct injection engine using multiple sparking.

Means for Solving the Problem

To achieve the object, the present invention provides (a) a start control device of a vehicular direct injection engine provided in a vehicle configured to execute an ignition start to raise rotation of the direct injection engine at a start of the direct injection engine by fuel injection and multiple sparking performed for a predetermined cylinder in an expansion stroke out of multiple cylinders of the direct injection engine, (b) the start control device of a vehicular direct injection engine reducing the number of times of sparking for the predetermined cylinder at the time of an ignition start of the direct injection engine as compared to an ignition start performed before the current ignition start based on ignition timing of the ignition start performed before the current ignition start.

Effects of the Invention

According to the engine start control device of a vehicular direct injection engine of the present invention, when an ignition start is performed, the direct injection engine is started with the number of times of sparking for a predetermined cylinder smaller as compared to an ignition start performed before the current ignition start based on ignition timing of the ignition start performed before the current ignition start and, therefore, the electric power consumption required for sparking can be reduced.

Preferably, (c) the engine start control device of a vehicular direct injection engine comprises an ignition determining portion detecting an ignition in a predetermined cylinder based on an ion current generated when combustion is caused in the predetermined cylinder, (d) the number of times of sparking is learned based on timing of generation of the ion current at an ignition start so as to reduce the number of times of sparking at an ignition start after the learning. Consequently, for example, the number of times of sparking is reduced while ensuring a reliable sparking in an ignition start by performing the sparking multiple times within a section that includes the ignition timing of the detection of an ion current in an ignition start performed before the current ignition start and that is at least before the ignition timing.

Preferably, (e) the engine start control device of a vehicular direct injection engine comprises an electric motor coupled to the direct injection engine and raising the rotation of the direct injection engine at a start of the direct injection engine, (f) if ignition is not detected based on the ion current by the ignition determining portion, the electric motor is used for starting the direct injection engine. Consequently, if the ion current is not detected due to a failure of the ignition start, the electric motor is used for starting the direct injection engine and, thus, the startability or the responsiveness of the direct injection engine is ensured.

Preferably, (g) when operation of the direct injection engine is stopped, the rotation is stopped such that the predetermined cylinder is in the expansion stroke, and (h) the ignition determining portion is disposed to detect an ion current by using a sparking plug disposed in the predetermined cylinder. Consequently, even if the ignition determining portion is configured to perform the detection only in the predetermined cylinder, the ion current can be detected in the quickest manner when the ignition start is performed, and the direct injection engine can be started in consideration of proper sparking timing.

Preferably, (i) the engine start control device of a vehicular direct injection engine comprises an engine stop control portion stopping the rotation of the direct injection engine such that the predetermined cylinder is in an expansion stroke by stopping fuel injection and/or sparking for the direct injection engine based on a preset rotation condition of the direct injection engine. Consequently, the rotation of the direct injection engine is stopped such that the predetermined cylinder is put in the expansion stroke without using an electric motor or a ratchet device coupled to the direct injection engine.

Preferably, (j) the direct injection engine is provided in a hybrid vehicle having an electric motor that is configured to perform as a drive force source for running, and is selectively coupled to the electric motor via a clutch, and (k) the electric motor transmits an assist torque via the clutch to the direct injection engine during a rising section of a rotation speed of the direct injection engine at a start of the direct injection engine, thereby assisting a rise in the rotation speed of the direct injection engine. Consequently, the assist torque output from the electric motor can be transmitted via the clutch to the direct injection engine during the rising section of the rotation speed of the direct injection engine at the start of the direct injection engine so as to assist the rise in the rotation speed of the direct injection engine and, thus, the stopped direct injection engine can be started by using a requisite and sufficient assist torque in the hybrid vehicle with the direct injection engine connected to and disconnected from the power transmission path by the clutch. Since the electric energy consumption is made smaller in the electric storage device at the start of the direct injection engine and leads to a reduction in the electric energy for engine start always secured in the electric storage device, an electric motor running region is expanded and the fuel consumption of the vehicle is preferably improved.

BRIEF DESCRIPTION OF THE DRAWINGS

FIG. 3 is a diagram for explaining the order of four-cycle stroke performed in each of the cylinders when the direct injection engine of FIG. 1 is a V-type eight-cylinder engine.

FIG. 4 is a cylinder phase diagram of mutual relationship of phases of four cylinders involved in explosions during one rotation of the crankshaft in a V-type eight-cylinder engine of FIG. 1.

FIG. 6 is a cylinder phase diagram for explaining an ignition start process in the V-type eight-cylinder four-cycle direct injection engine of FIG. 1, including: (a) representative of a stop state with the predetermined first cylinder being in an expansion stroke, i.e., at 45 degrees ATDC; (b) representative of a state of performing the fuel injection into the first cylinder and the sparking in the stop state; (c) representative of a state in which the initial explosion caused by the sparking in the first cylinder leads to the start of rotation (staring) due to a torque from the initial explosion so that the compression in the second cylinder and the compression in the third cylinder are started; (d) representative of a state of performing the fuel injection and sparking in a second cylinder in the compression stroke, which reaches TDC; (e) representative of a state in which further rotation due to the torque generated by the second explosion further advances the high pressure state and the compression in the third cylinder; and (f) representative of a state in which further rotation due to the torque generated by the second explosion in the second cylinder causes the third cylinder to reach the TDC so that the fuel injection and the sparking are performed and the compression in the fourth cylinder K4 is further advanced.

MODE FOR CARRYING OUT THE INVENTION

An embodiment of the present invention will now be described in detail with reference to the drawings.

Embodiment

Figure 1:
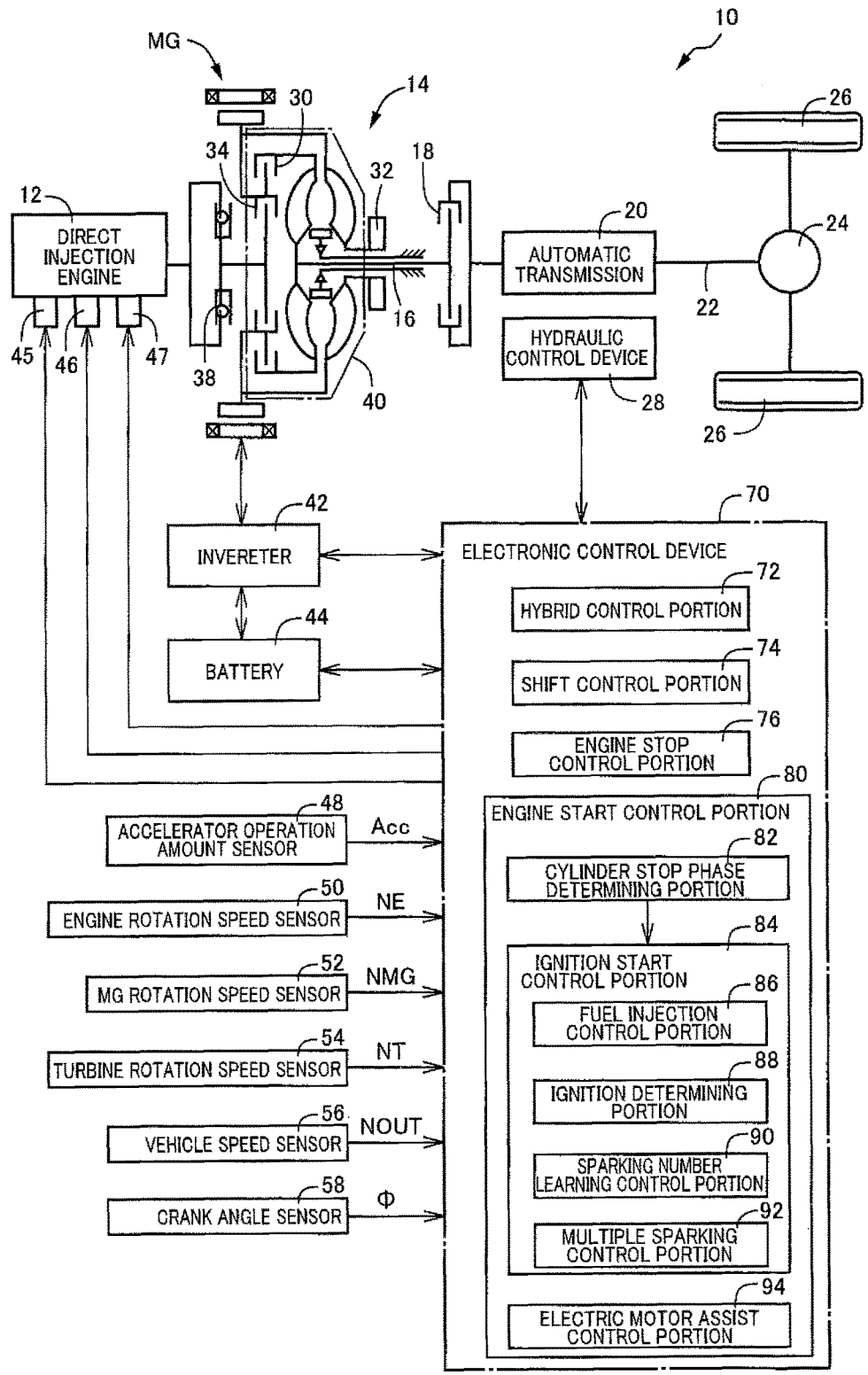
FIG. 1 is a block diagram including a schematic diagram for explaining a main portion of a mechanical configuration of a hybrid vehicle to which the present invention is preferably applied and a functional block diagram indicating a main portion of the control function of the electronic control device.

FIG. 1 is a diagram of a general configuration including a schematic of a drive system of a hybrid vehicle 10 to which the present invention is applied. The hybrid vehicle 10 includes as drive force sources for running a direct injection engine 12 directly injecting and sparking fuel in a cylinder and a motor generator MG acting as an electric motor for a drive source and as an electric generator. The output of the direct injection engine 12 and the motor generator MG is transmitted from a torque converter 14 that is a fluid power transmission device to a turbine shaft 16 and an automatic transmission 20 including a C1 clutch 18 and further transmitted via an output shaft 22 and a differential gear device 24 to left and right drive wheels 26. The torque converter 14 includes a lockup clutch (L/U clutch) 30 directly coupling a pump impeller to a turbine impeller, and the pump impeller is integrally connected to an oil pump 32 and is mechanically rotationally driven by the engine 12 and the motor generator MG. The motor generator MG corresponds to a rotating machine.

Figure 2:
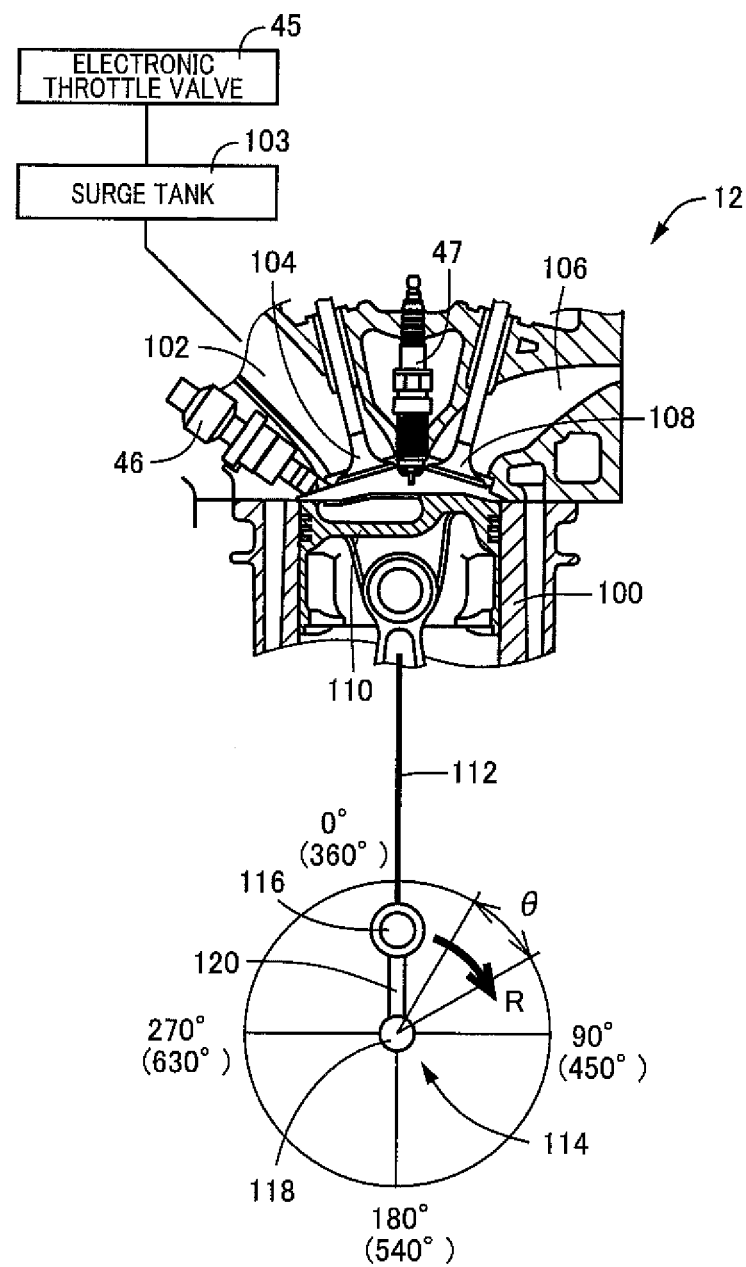
FIG. 2 is a cross sectional diagram for explaining a direct injection engine of the hybrid vehicle of FIG. 1.

For the direct injection engine 12, a V-type eight-cylinder four-cycle gasoline engine is used in this embodiment and, as specifically depicted in FIG. 2, gasoline is directly injected in a high-pressure particulate state by a fuel injection valve 46 into a cylinder 100. The direct injection engine 12 allows air to flow from an intake passage 102 via an intake valve 104 into the cylinder 100 and allows exhaust gas to be discharged via an exhaust valve 108 from an exhaust passage 106 and, when sparking is caused by a sparking plug 47 at predetermined timing, air-fuel mixture in the cylinder 100 is exploded and combusted to push down a piston 110 to the lower side. The intake passage 102 is connected via a surge tank 103 to an electronic throttle valve 45 acting as an intake air amount adjustment device so as to control an amount of intake air flowing from the intake passage 102 into the cylinder 100, i.e., engine output, in accordance with an opening degree of the electronic throttle valve 45 (throttle valve opening degree). The piston 110 is axially slidably fitted into the cylinder 100 and is relatively rotatably coupled via a connecting rod 112 to a crank pin 116 of a crankshaft 114, and the crankshaft 114 is rotationally driven as indicated by an arrow R in accordance with linear reciprocating movement of the piston 110. The crankshaft 114 is rotatably supported by a bearing in a journal portion 118 and integrally includes a crank arm 120 connecting the journal portion 118 and the crank pin 116.

The direct injection engine 12 as described above performs four strokes, i.e., an intake stroke, a compression stroke, an expansion (explosion) stroke, and an exhaust stroke, per two rotations (720 degrees) of the crankshaft 114 for each cylinder and this is repeated to allow the crankshaft 114 to continuously rotate. The pistons 110 of the eight cylinders 100 are configured to have the respective crank angles shifted by 90 degrees from each other and, in other words, positions of the crank pins 116 of the crankshaft 114 are projected in directions shifted by 90 degrees from each other and, each time the crankshaft 114 rotates by 90 degrees, the eight cylinders 100 are exploded and combusted in a preset sparking order depicted in, for example, FIG. 3, thereby continuously generating a rotation torque. When the crankshaft 114 rotates by a predetermined angle from a top dead center (compression TDC) after the compression stroke and the piston 110 is stopped within a predetermined angle range θ in the expansion stroke with both the intake valve 104 and the exhaust valve 108 closed, gasoline can be injected by the fuel injection valve 46 into the cylinder 100 while the sparking plug 47 discharges electricity for sparking, so as to perform an ignition start in which the air-fuel mixture in the cylinder 100 is exploded and combusted to raise an engine rotation speed. If friction of the portions of the direct injection engine 12 is small, the direct injection engine 12 can be started by only the ignition start and, even if the friction is large, the ignition start can reduce a start assist torque at the time of start with cranking of the crankshaft 114 and, therefore, a maximum torque of the motor generator MG generating the assist torque can be reduced to achieve miniaturization and lower fuel consumption. When the angle range θ is within a range of, for example, about 30 to 60 degrees in terms of a crank angle CA after the top dead center, relatively large rotation energy can be acquired from the ignition start to reduce the assist torque; however, even at about 90 degrees, rotation energy can relatively be acquired from the ignition start to reduce the assist torque.

FIG. 3 is a diagram for explaining working strokes corresponding to the crank angle CA of each of the cylinders No. 1 to No. 8 when the direct injection engine 12 is a V-type eight-cylinder engine operating in four cycles. Although the cylinders No. 1 to No. 8 represent mechanical arrangement positions, the sparking order based on the crank angle CA of 0 degrees is an order of the cylinder No. 2, the cylinder No. 4, the cylinder No. 5, the cylinder No. 6, the cylinder No. 3, the cylinder No. 7, the cylinder No. 8, and the cylinder No. 1. For example, assuming that the cylinder No. 7 is a first cylinder K1 in the sparking order, the cylinder No. 8, the cylinder No. 1, and the cylinder No. 2 are a second cylinder K2, a third cylinder K3, and a fourth cylinder K4, respectively. FIG. 4 is a cylinder phase diagram of mutual relationship of phases of four cylinders involved in explosions during one rotation of the crankshaft 114 in a V-type eight-cylinder engine, and the first to fourth cylinders K1 to K4 rotate clockwise while maintaining a 90-degree relationship from each other to sequentially perform the compression stroke in which intake air is compressed from the closing of the intake valve until the TDC and the expansion stroke in which the piston 110 is pushed down by expansion of exploded gas from the TDC until the opening of the exhaust valve. The phase of the fourth cylinder K4 of FIG. 4 is in the second half of the expansion (explosion) stroke; the phase of the first cylinder K1 is in the first half of the expansion stroke; the phase of the second cylinder K2 is in the second half of the compression stroke; and the phase of the third cylinder K3 is before the start of the compression stroke.

Returning to FIG. 1, a K0 clutch 34 is disposed between, and directly couples, the direct injection engine 12 and the motor generator MG via a damper 38. The K0 clutch 34 is a hydraulic friction engagement device such as a single-plate or multi-plate friction clutch frictionally engaged by a hydraulic cylinder and is subjected to engagement/release control by an electromagnetic linear control valve in a hydraulic control device 28 and disposed in an oil bath condition within an oil chamber 40 of the torque converter 14 in this embodiment. The K0 clutch 34 acts as a connecting/disconnecting device connecting and disconnecting the direct injection engine 12 to/from a power transmission path. The motor generator MG is connected via an inverter 42 to a battery 44. The automatic transmission 20 is a stepped automatic transmission of planetary gear type etc., having a plurality of gear stages with different gear ratios established depending on engaged/released states of a plurality of hydraulic friction engagement devices (clutches and brakes) and is subjected to shift control by electromagnetic hydraulic control valves, switching valves, etc., disposed in the hydraulic control device 28. The C1 clutch 18 acts as an input clutch of the automatic transmission 20 and is also subjected to engagement/release control by the electromagnetic linear control valve in the hydraulic control device 28.

The hybrid vehicle 10 as described above is controlled by an electronic control device 70. The electronic control device 70 includes a so-called microcomputer having a CPU, a ROM, a RAM, an I/O interface, etc., to execute signal processes in accordance with a program stored in advance in the ROM, while utilizing a temporary storage function of the RAM. The electronic control device 70 is supplied with a signal indicative of an operation amount (accelerator operation amount) Acc of an accelerator pedal from an accelerator operation amount sensor 48. The electronic control device 70 is also supplied with pulse signals Φ indicative of a rotation speed (engine rotation speed) NE of the direct injection engine 12, a rotation speed (MG rotation speed) NMG of the motor generator MG, a rotation speed (turbine rotation speed) NT of the turbine shaft 16, a rotation speed (output shaft rotation speed corresponding to vehicle speed V) NOUT of the output shaft 22, and a rotation angle from the TDC (top dead center), i.e., the crank angle CA, of each of the eight cylinders 100, from an engine rotation speed sensor 50, an MG rotation speed sensor 52, a turbine rotation speed sensor 54, a vehicle speed sensor 56, and a crank angle sensor 58, respectively. Various pieces of information necessary for various controls are also supplied. The accelerator operation amount Acc corresponds to an output request amount.

Figure 5:
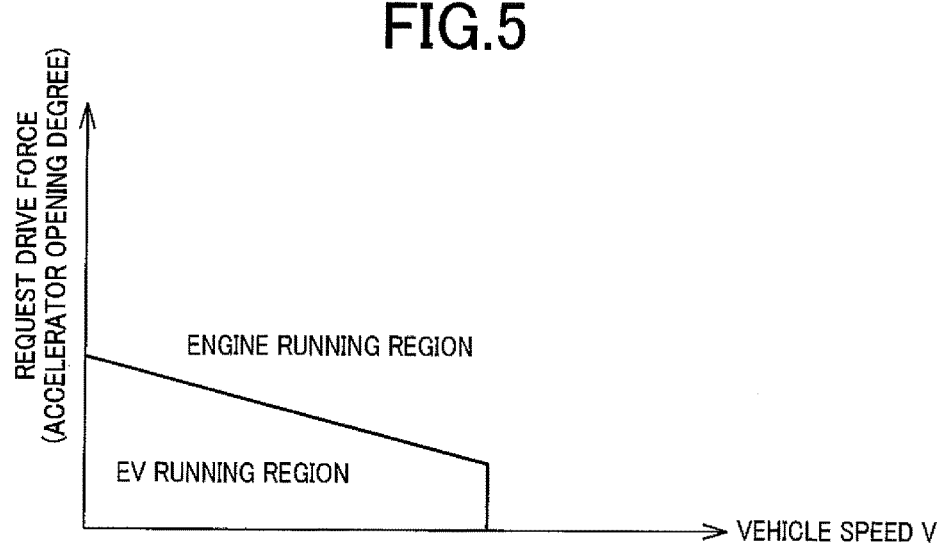
FIG. 5 is a diagram for illustrating a relationship stored in advance in order to determine any one of a motor running region and an engine running region based on a vehicle speed V and a request output amount (accelerator opening degree) in a hybrid running control.

The electronic control device 70 functionally includes a hybrid control portion 72, a shift control portion 74, an engine stop control portion 76, and an engine start control portion 80. The hybrid control portion 72 determines, for example, from a relationship depicted in FIG. 5, any one running region out of a motor running region in which only the motor generator MG is used as a drive force source for running and an engine running region in which only the direct injection engine 12 or the direct injection engine 12 and the motor generator MG are used as the drive force source for running, based on the vehicle speed V and a request output amount (an accelerator opening degree) from a relationship stored in advance depicted in FIG. 5, for example, and controls actuation of the direct injection engine 12 and the motor generator MG such that the determined running region is acquired, thereby achieving running in a plurality of predefined running modes, such as a motor running (EV running) mode, an engine running mode, and an engine+motor running (HV running) mode selectively using both for running. The shift control portion 74 controls the electromagnetic hydraulic control valves, switching valves, etc., disposed in the hydraulic control device 28 to switch the engagement/release state of the plurality of the hydraulic friction engagement devices, thereby switching a plurality of the gear stages of the automatic transmission 20 in accordance with a relationship or a shift map defined in advance by using operating states such as the accelerator operation amount Ace and the vehicle speed V as parameters. This relationship or the shift map is the operation point of the direct injection engine 12 or the motor generator MG obtained in advance such that a request drive force is satisfied at optimum fuel consumption or optimum efficiency.

The engine stop control portion 76 stops fuel supply to and sparking of the direct injection engine 12 to stop the rotation of the direct injection engine 12 and releases the K0 clutch 34 as needed, based on an eco-run stop request made at the time of satisfaction of idling reduction conditions, such as whether the accelerator pedal is off, vehicle speed is zero, "D" range is selected and the brake is on, and an engine stop request at the time of switching from the engine running region to the motor running region during running.

When stopping the direct injection engine 12, after stabilizing at a preset low-speed rotation number such as 1000 rpm, the engine stop control portion 76 stops the fuel supply and the sparking at the timing empirically obtained in advance to stop the crankshaft of the direct injection engine 12 in a phase in which certain cylinders, for example, the first and fourth cylinders K1 and K4, are in the expansion stroke, preferably, at an angular position (phase) of FIG. 6(a) where the first cylinder K1 is at near 45 degrees ATDC. The stop phase control of the direct injection engine 12 may be provided by using the motor generator MG; or a ratchet mechanism not depicted may be used.

The engine start control portion 80 includes a cylinder stop phase determining portion 82, an ignition start control portion 84, and an electric motor assist control portion 94, performs the ignition start of the direct injection engine 12 while providing assist from the motor generator MG as needed so as to restart the direct injection engine 12 in response to an engine restart request corresponding to the brake-off during stop of idling, the switching from the motor running region to the engine running region, etc., and terminates the restart control to engage the K0 clutch 34 based on that the rotation speed (engine rotation speed) NE of the direct injection engine 12 reaches a preset termination determination value NE1, for example.

The cylinder stop phase determining portion 82 determines whether the predetermined first cylinder K1 of the multiple cylinders of the direct injection engine 12 is in a stop state with the crank angle CA within an angle range of 0 to 90 degrees ATDC, for example, near 45 degrees ATDC, based on the signal Φ from the crank angle sensor 58 detecting the crank angle CA from the TDC (top dead center) of the crankshaft 114 of the direct injection engine 12, for example.

After the cylinder stop phase determining portion 82 determines that any cylinder, i.e., the first cylinder K1, of the direct injection engine 12 is in a phase state of being located at the compression TDC, the ignition start control portion 84 injects fuel from the fuel injection valve 46 into the first cylinder K1 and performs multiple sparking by the sparking plug 47 in response to the restart request to cause an initial explosion (first explosion), raising the engine rotation speed NE, and subsequently causes a second explosion in the second cylinder K2 and further causes a third explosion in the third cylinder K3 by multiple sparking in the same way, thereby further raising the engine rotation speed NE, FIG. 6 is a cylinder phase diagram for explaining an ignition start process of the ignition start control portion 84 in the V-type eight-cylinder four-cycle direct injection engine 12, including: (a) representative of a stop state with the first cylinder K1 at 45 degrees ATDC (after top dead center); (b) representative of a state of performing the fuel injection from the fuel injection valve 46 into the first cylinder K1 and the sparking by the sparking plug 47 in the stop state; (c) representative of a state in which the initial explosion caused by the sparking in the first cylinder K1 leads to the start of rotation of the crankshaft due to a torque from the initial explosion so that the compression in the second cylinder K2 and the compression in the third cylinder K3 are started; (d) representative of a state of performing the fuel injection and sparking in the completely compressed second cylinder K2; (e) representative of a state in which further rotation due to the torque generated by the second explosion in the second cylinder K2 further advances the expansion in the third cylinder K3 and the compression in the fourth cylinder K4; and (f) representative of a state in which further rotation due to the torque generated by the second explosion in the second cylinder K2 causes the third cylinder K3 to reach the TDC so that the fuel injection from the fuel injection valve 46 into the third cylinder K3 and the sparking by the sparking plug 47 are performed. In the fourth cylinder K4 in the state (b), a misfire is highly likely to occur due to the immediate opening of the exhaust valve and, therefore, the fuel injection and sparking are not performed for the fourth cylinder K4.

Figure 7:
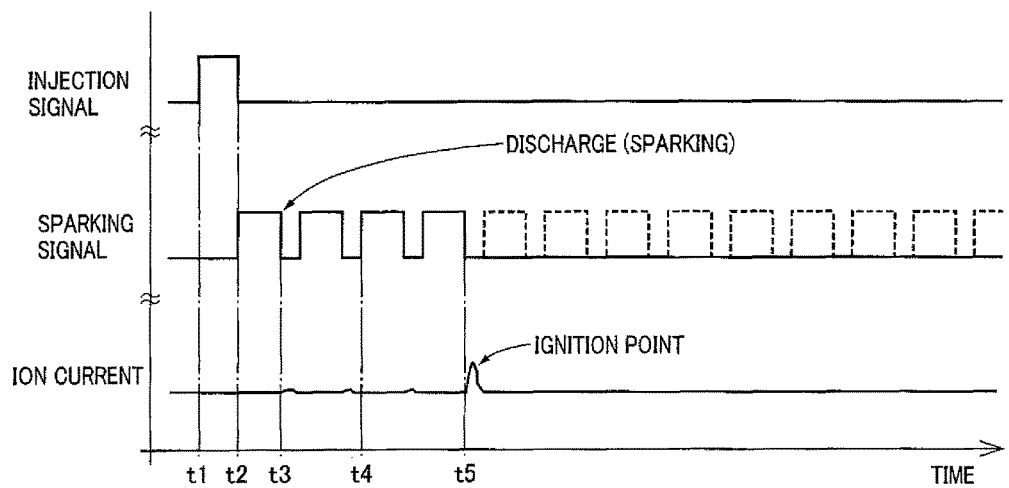
FIG. 7 is a time chart of a main portion of the control operation performed by the electronic control device of FIG. 1, i.e., ignition start control with multiple sparking and multiple sparking stop control after ion current detection at the time of an engine restart before learning.

The ignition start control portion 84 includes a fuel injection control portion 86, an ignition determining portion 88, a sparking number learning control portion 90, and a multiple sparking control portion 92. The fuel injection control portion 86 calculates a fuel injection amount at the start of the direct injection engine 12 based on, for example, a capacity in a cylinder into which fuel should be injected, an air temperature, and an engine cooling water temperature from a relationship stored in advance, drives the fuel injection valve 46 with an injection signal of a time width for acquiring the fuel injection amount in response to the restart request, and sequentially injects the fuel from the fuel injection valve 46 to the first cylinder K1 that is an initial explosion cylinder and subsequently to the second cylinder K2, the third cylinder K3, and the fourth cylinder K4. FIG. 7 is a time chart for explaining fuel injection and sparking operation for a predetermined cylinder and time t1 indicates the fuel injection start timing described above.

Subsequently, from the timing of falling of an injection signal pulse, i.e., time t2 of FIG. 7, the multiple sparking control portion 92 outputs a series of sparking signals in cycles of, for example, about 4 ms, to an igniter not depicted after the sparking signal and allows a high voltage (an induced electromotive force) output from the igniter to cause the sparking plug 47 included in the fuel-injected cylinder to successively generate a plurality of arcs. The high voltage is output from the igniter at the timing of falling of the sparking signal, i.e., time t3 of FIG. 7. Although a flow in the cylinder is hardly formed immediately after the start and leads to variations in time until an air-fuel mixture of atomized or vaporized fuel mixed with air to be in a combustible air-fuel ratio range passes through the sparking plug 47, the combustion is started at any time point of a plurality of the successively generated arcs.

The ignition determining portion 88 determines the ignition (first explosion) based on whether a preset combustion start determination value (threshold value) is exceeded by an ion current generated by the combustion and detected when a direct electric field of predetermined intensity, for example, several hundred volts, is applied to an electrode of the sparking plug 47 immediately after supply of the sparking signal pulse in the initial explosion cylinder with fuel injected by the fuel injection control portion 86. Time t5 of FIG. 7 indicates this state. The initial explosion cylinder is preferably equipped with a sparking plug including an ion-current detection electrode having a gap suitable for a corona discharge and is connected to a power source device applying the direct electric field to the ion-current detection electrode. The multiple sparking control portion 92 aborts the output of the sparking signals after determination of ignition by the ignition determining portion 88 as indicated by broken lines of FIG. 7.

Figure 8:
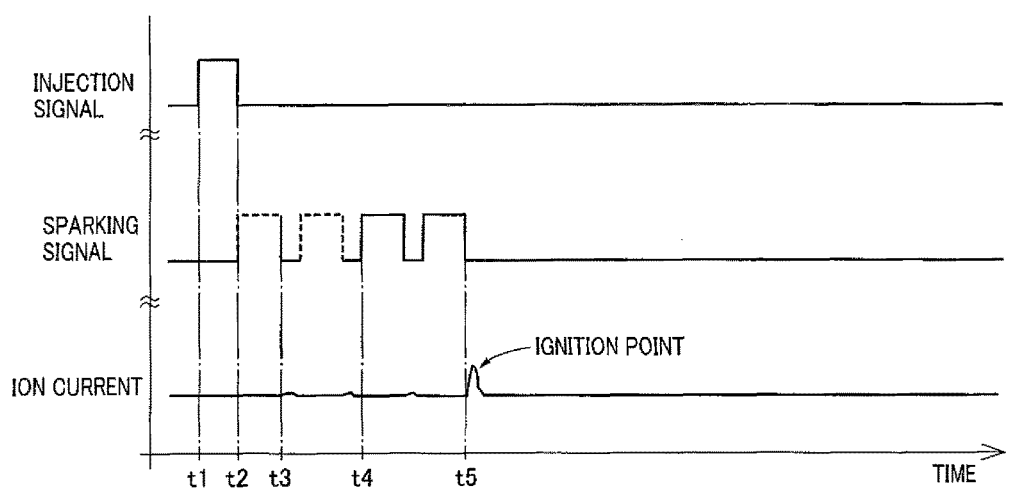
FIG. 8 is a time chart of a main portion of the control operation performed by the electronic control device of FIG. 1, i.e., ignition start control with multiple sparking at the time of an engine restart after learning.

The sparking number learning control portion 90 performs learning and changes the number of sparking signals for multiple sparking, i.e., the number of times of sparking, when the engine is started at the next and subsequent starts after learning, based on the ignition time point t5 determined by the ignition determining portion 88, such that the number of sparking signals before the ignition time point t5 is reduced to a predetermined number while the number of sparking signals after the ignition time point t5 is reduced to zero or a predetermined number, and causes the multiple sparking control portion 92 to output the sparking signals at the next engine start. For example, if the ignition is determined at the falling of a fourth sparking signal, as depicted in FIG. 8, the sparking number learning control portion 90 causes the multiple sparking control portion 92 to output the sparking signal pulses from a third sparking signal previous thereto to the fourth sparking signal at the determination of the ignition, at the next and subsequent ignition starts after the learning. For example, the sparking signals for the next multiple sparking are made up of the sparking signal pulses until the ignition determination timing t5 from the predetermined number of pulse cycles before the ignition determination timing t5. The predetermined number of the sparking signal pulses before the ignition determination timing t5 is a margin value for stabilizing the ignition regardless of the variations in time until the air-fuel mixture of atomized or vaporized fuel mixed with air to be in a combustible air-fuel ratio range reaches the sparking plug 47, and is empirically defined in advance.

When the rotation of the direct injection engine 12 is raised by only the multiple sparking of the multiple sparking control portion 92, the electric motor assist control portion 94 does not provide a torque assist; however, if the initial explosion is not achieved due to a misfire of the direct injection engine 12 or if the rotation of the direct injection engine 12 decreases after a first sparking operation by the ignition start control portion 84 and it is determined that the rotation is not sufficiently raised, the electric motor assist control portion 94 immediately engages the K0 clutch 34 in a rotation rising section thereof and provides a torque assist from the motor generator MG so as to increase the engine rotation speed NE of the direct injection engine 12 again to a preset self-operable rotation speed or higher to restart the direct injection engine 12.

Based on whether the engine rotation speed NE is raised by the ignition start control of the ignition start control portion 84 or raised additionally by engagement of the K0 clutch 34 and the torque assist from the motor generator MG by the electric motor assist control portion 94 and reaches a self-operable rotation speed NE1 set in advance to about 400 rpm or whether a change rate (an increase rate, i.e., an increase speed) dNE/dt of the engine rotation speed NE reaches a preset autonomously operable increase speed dNE1/dt, the termination of the torque assist at the restart of the direct injection engine 12, i.e., the termination of the restart control of the direct injection engine 12 is determined.

Figure 9:
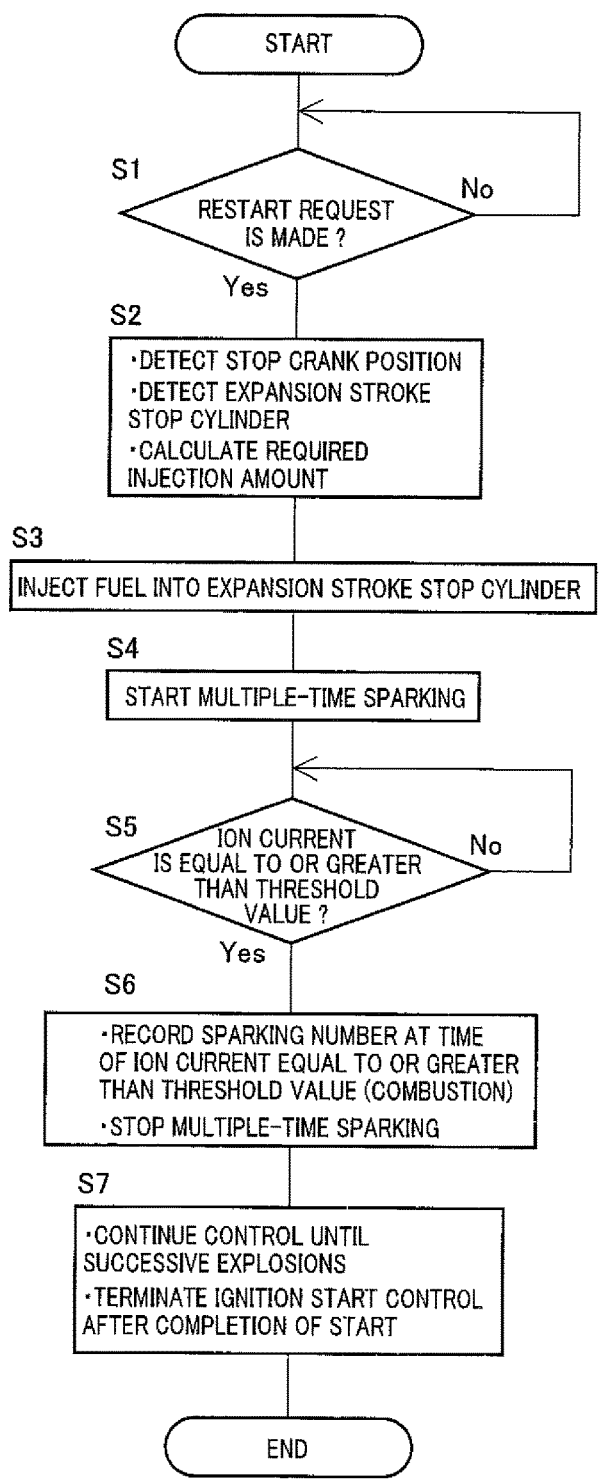
FIG. 9 is a flow chart for explaining a main portion of the control operation performed by the electronic control device of FIG. 1, i.e., ignition start control with multiple sparking and multiple sparking stop control after ion current detection at the time of an engine restart before learning.
Figure 10:
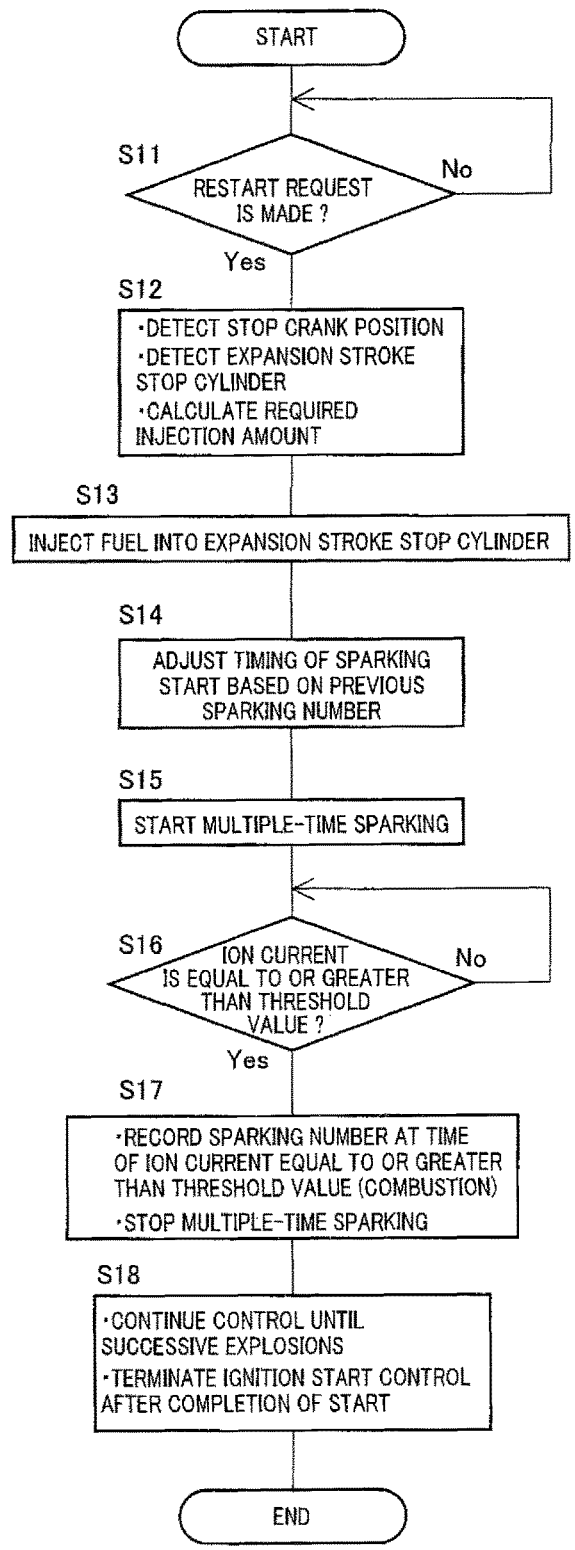
FIG. 10 is a flow chart for explaining a main portion of the control operation performed by the electronic control device of FIG. 1, i.e., ignition start control with multiple sparking at the time of an engine restart after learning.

FIGS. 9 and 10 are flowcharts for explaining a main portion of the control operation of the electronic control device 70 and is repeatedly executed in cycles of a few msec to a few tens of msec, for example. FIG. 9 depicts the initial ignition start control with multiple sparking before learning and FIG. 10 depicts the ignition start control with multiple sparking after learning.

In FIG. 9, at step S1 (hereinafter, step will be omitted), it is determined whether the restart request is made. At S2, a stop crank angle position (a stop phase) and an expansion stroke stop cylinder of the direct injection engine 12 are detected, and a required injection amount of fuel for a restart is calculated based on the phase. S2 corresponds to the cylinder stop phase determining portion 82 and the fuel injection control portion 86. At S3 corresponding to the fuel injection control portion 86, the fuel is injected into the expansion stroke cylinder, for example, the first cylinder K1. A section from t1 to t2 of FIG. 7 indicates this state. At S4 corresponding to the multiple sparking control portion 92, a plurality of the sparking signals are successively output to cause the sparking plug 47 to generate arcs in the fuel-injected cylinder, as depicted after time t2 in FIG. 7.

At S5 corresponding to the ignition determining portion 88, it is determined whether the ion current becomes equal to or greater than a preset ignition determination value (threshold value) immediately after the sparking signal, i.e., whether the initial explosion is caused. If the determination at S5 is negative, S5 is repeatedly executed in a standby state. However, if the determination of S5 is affirmative, the process from S6 is executed. Time t5 of FIG. 7 indicates this state.

At S6 corresponding to the sparking number learning control portion 90 and the multiple sparking control portion 92, a sparking number is recorded when the ion current becomes equal to or greater than the ignition determination value and the ignition is determined, and the subsequent multiple sparking is stopped. At S7 corresponding to the multiple sparking control portion 92, the multiple sparking operation described above is repeatedly performed for each cylinder in order of sparking until the rotation number at which the direct injection engine 12 can autonomously operate and, when the direct injection engine 12 attains the autonomous operation state, this ignition start control is terminated.

At the next and subsequent ignition starts of the direct injection engine 12 after the learning, the control operation of FIG. 10 is performed. In FIG. 10, S11 to S13 are executed in the same way as S1 and S3 of FIG. 9. At S14 corresponding to the sparking number learning control portion 90, a change is made through learning in the number and the timing of sparking signals for the multiple sparking when the engine is started at the next and subsequent starts, based on time t5, which is the ignition (explosion) timing when the ion current exceeds the ignition determination value at the engine start. For example, as depicted in FIG. 8, the sparking signal pulses from the third sparking signal previous to the time point of ignition determination based on the ion current detection to the fourth sparking signal at the ignition determination are set for output at the time of the next and subsequent ignition starts.

As described above, according to the engine start control portion 80 of the hybrid vehicle 10 of this embodiment, at least for the initial explosion cylinder, i.e., the second cylinder K2, when an ignition start of the direct injection engine 12 is performed, the direct injection engine 12 is started by multiple sparking with the number of times of sparking smaller as compared to an ignition start performed before the current ignition start based on ignition (explosion) timing of the ignition start performed before the current ignition start and, therefore, the electric power consumption required for sparking can be reduced.

The engine start control portion 80 of the hybrid vehicle 10 of this embodiment includes the ignition determining portion detecting an ignition (first explosion) in a predetermined initial explosion cylinder, i.e., the second cylinder K2, based on an ion current generated at the time of combustion in the cylinder, and when an ignition start is performed, the number of times of multiple sparking is learned based on the timing of generation of the ignition (first explosion) in an ignition start performed before the current ignition start so as to reduce the number of times of the multiple sparking at the next and subsequent ignition starts after the learning. Therefore, for example, the number of times of sparking is reduced while ensuring a reliable sparking in an ignition start by performing the sparking multiple times within a section that includes the ignition (explosion) timing of the determination of an ion current exceeding a threshold value in an ignition start performed before the current ignition start and that is at least before the ignition (explosion) timing.

The engine start control portion 80 of the hybrid vehicle 10 of this embodiment includes the motor generator (electric motor) MG coupled to the direct injection engine 12 and raising the rotation of the direct injection engine 12 at the start of the direct injection engine 12 and, if ignition is not detected based on an ion current by the ignition determining portion 88, the motor generator MG is used for starting the direct injection engine 12. Therefore, if ignition is not detected based on an ion current by the ignition determining portion 88 due to a failure of an ignition start, the motor generator MG is used for starting the direct injection engine 12 and, thus, the startability and the responsiveness of the direct injection engine 12 are ensured.

According to the engine start control portion 80 of the hybrid vehicle 10 of this embodiment, when the operation of the direct injection engine 12 is stopped, the rotation is stopped such that the preset initial explosion cylinder, i.e., the first cylinder K1, is in the expansion stroke, for example, at near 45 degrees ATDC, and the ignition determining portion 88 is disposed to detect the ion current by using the plug mounted on the initial explosion cylinder. Therefore, even if the ignition determining portion 88 is configured to perform the detection only in the predetermined initial explosion cylinder, the ion current can be detected in the quickest manner when the ignition start is performed, and the direct injection engine 12 can be started in consideration of proper sparking timing.

The engine start control portion 80 of the hybrid vehicle 10 of this embodiment includes an engine stop control portion 76 stopping fuel injection and/or sparking for the direct injection engine 12 based on a preset rotation condition of the direct injection engine 12 so as to stop the rotation of the direct injection engine such that the predetermined initial explosion cylinder is in the expansion stroke. Therefore, the rotation of the direct injection engine 12 is stopped such that the predetermined initial explosion cylinder is put in the expansion stroke without using an electric motor or a ratchet device coupled to the direct injection engine 12.

According to the engine start control portion 80 of the hybrid vehicle 10 of this embodiment, the direct injection engine 12 is selectively coupled to the motor generator MG via the K0 clutch 34 in the hybrid vehicle having the motor generator (electric motor) MG that can be used as a drive force source for running, and the motor generator MG transmits an assist torque via the K0 clutch 34 to the direct injection engine 12 during the rising section of the rotation speed of the direct injection engine 12 at the start of the direct injection engine 12, thereby assisting the rise in the rotation speed of the direct injection engine 12. Therefore, the assist torque output from the motor generator MG can be transmitted via the K0 clutch 34 to the direct injection engine 12 during the rising section of the rotation speed of the direct injection engine 12 at the start of the direct injection engine 12 so as to assist the rise in the rotation speed of the direct injection engine 12 and, thus, the stopped direct injection engine 12 can be started by using a requisite and sufficient assist torque in the hybrid vehicle with the direct injection engine 12 connected to and disconnected from the power transmission path by the K0 clutch 34. Since the electric energy consumption is made smaller in the battery (electric storage device) 44 at the start of the direct injection engine 12 and leads to a reduction in the electric energy for engine start always secured in the electric storage device, an electric motor running region is expanded and the fuel consumption of the vehicle is preferably improved.

Although the embodiment of the present invention has been descried in detail with reference to the drawings, the present invention is applied in other forms.

For example, although the vehicle is the hybrid vehicle 10 of a parallel type etc., having the power transmission path from the direct injection engine 12 and the motor generator MG to the drive wheels 26 connected and disconnected by the K0 clutch 34, the present invention is also applied to a vehicle using the direct injection engine 12 as the drive source, for example, a vehicle equipped with a stepped automatic transmission or a continuously variable transmission. The present invention is applied to the hybrid vehicle 10 when the direct injection engine 12 is started at the time of switching from the electric motor running to the engine running, and is applied to the vehicle equipped with a stepped automatic transmission or a continuously variable transmission when the engine is started while idling is stopped. The K0 clutch 34 is preferably implemented by using a single-plate or multi-plate hydraulic friction engagement clutch, a magnetic powder clutch, or an electromagnetic clutch.

Although the hybrid vehicle 10 of the embodiment includes the one motor generator MG as the drive electric motor, a second motor generator may be disposed on, for example, an output shaft of the automatic transmission 20 of FIG. 1 to drive the left and right drive wheels 26 via the vehicle differential gear device 24. To make up a four-wheel drive vehicle, the second motor generator may be disposed that drives only the other wheels (front wheels if the drive wheels 26 are rear wheels) not depicted in FIG. 1.

Although the hybrid vehicle 10 of the embodiment includes the torque converter 14 with the lockup clutch 30 between the K0 clutch 34 and the automatic transmission 20, the torque converter 14 may not necessarily be disposed. The C1 clutch 18 acting as the input clutch of the automatic transmission 20 may be housed in the automatic transmission 20 to make up one of multiple friction engagement devices for achieving a shift stage.

The direct injection engine 12 of the hybrid vehicle 10 is preferably a gasoline engine and the present invention is also applicable to multi-cylinder engines having three or more cylinders and particularly to direct injection engines having six cylinders, eight cylinders, twelve cylinders, etc. In short, the present invention is applicable to any reciprocating internal combustion engine in which a predetermined initial explosion cylinder of multiple cylinders is in a rotation phase within a predetermined range after the top dead center while the initial explosion cylinder is in the expansion stroke with the exhaust valve unopened so that the ignition start can be performed by injecting fuel into the cylinder in the expansion stroke.

Although the direct injection engine 12 of the above example is a V-type eight-cylinder engine, the present invention is applicable when the direct injection engine is an engine in which the crank angle CA of the first cylinder is located between the TDC (top dead center) of the first cylinder K1 and the TDC (top dead center) of the second cylinder K2 in order of sparking while the first cylinder K1 is in the compression stroke with the exhaust valve of the first cylinder K1 unopened. In the case of a typical engine in which the opening of the exhaust valve is started after 140 degrees ATDC in the compression stroke, the direct injection engine 12 may be any multi-cylinder engines including five or more cylinders. Thus, when the direct injection engine 12 is a four-cycle direct injection engine with three or more cylinders, i.e., a direct injection engine with three cylinders, four cylinders, five cylinders, six cylinders, eight cylinders, twelve cylinders, etc., and the direct injection engine is started while the crank angle CA of the predetermined cylinder, i.e., the first cylinder, is located between the TDC (top dead center) of the first cylinder K1 and the TDC (top dead center) of the second cylinder K2 in order of sparking, the engine can be started by directly injecting and sparking fuel in the first cylinder K1 in the expansion stroke with the exhaust valve unopened so that the first explosion is caused in the first cylinder to raise the engine rotation speed NE and by using a requisite and sufficient assist torque; as a result, the electric energy consumption is made smaller in an electric storage device at the start of the four-cycle direct injection engine having three or more cylinders and leads to a reduction in the electric energy for engine start always secured in the electric storage device; and, therefore, the electric motor running region is expanded and the fuel consumption of the vehicle is preferably improved.

Although the electric motor assist control portion 94 uses the motor generator MG to provide a torque assist for raising the engine rotation speed NE, a sel-motor disposed on the direct injection engine 12 may be used for raising the engine rotation speed NE or providing the torque assist.

Although the explosion in the cylinder is determined at S6 of the embodiment based on that the ion current becomes equal to or greater than the present ignition determination value, the explosion in the cylinder may be determined based on output of a vibration sensor disposed on the engine 12 equal to or greater than a predetermined value or a change rate of the engine rotation speed NE equal to or greater than a predetermined value.

The above description is merely an embodiment of the present invention and the present invention can be implemented in variously modified and improved forms based on the knowledge of those skilled in the art within a range not departing from the spirit thereof.

NOMENCLATURE OF ELEMENTS

10: hybrid vehicle 12: direct injection engine 34: K0 clutch (clutch) 44: battery (electric storage device) 70: electronic control device (engine start control device) 76: engine stop control portion 80: engine start control portion 84: ignition start control portion 88: ignition determining portion 90: sparking number learning control portion 92: multiple sparking control portion 94: electric motor assist control portion MG: motor generator (electric motor)

The invention claimed is:

1. A start control device of a vehicular direct injection engine provided in a vehicle, the start control device comprising:
    an electronic control unit configured to execute an ignition start to raise rotation of the direct injection engine at a start of the direct injection engine by fuel injection and multiple sparking performed for a predetermined cylinder in an expansion stroke out of multiple cylinders of the direct injection engine,
    wherein the electronic control unit reduces a number of times of sparking for the predetermined cylinder at a time of a current ignition start of the direct injection engine as compared to a prior ignition start performed before the current ignition start based on ignition timing of the prior ignition start performed before the current ignition start.

2. The start control device of a vehicular direct injection engine of claim 1, wherein the electronic control unit detects an ignition in the predetermined cylinder based on an ion current generated when combustion is caused in the predetermined cylinder, wherein
    the number of times of sparking is learned based on timing of generation of the ion current at an ignition start so as to reduce the number of times of sparking at an ignition start after the learning.

3. The start control device of a vehicular direct injection engine of claim 2, comprising an electric motor coupled to the direct injection engine and raising the rotation of the direct injection engine at a start of the direct injection engine, wherein
    if ignition is not detected based on the ion current by the electronic control unit, the electric motor is used for starting the direct injection engine.

4. The start control device of a vehicular direct injection engine of claim 2, wherein when operation of the direct injection engine is stopped, the rotation is stopped such that the predetermined cylinder is in the expansion stroke, and wherein the electronic control unit is disposed to detect the ion current in the predetermined cylinder.

5. The start control device of a vehicular direct injection engine of claim 1, wherein the electronic control unit stops the rotation of the direct injection engine such that the predetermined cylinder is in an expansion stroke by stopping fuel injection or sparking for the direct injection engine based on a preset rotation condition of the direct injection engine.

6. The start control device of a vehicular direct injection engine of claim 1, wherein the direct injection engine is provided in a hybrid vehicle having an electric motor that is configured to perform as a drive force source for running, and is selectively coupled to the electric motor via a clutch, and wherein the electric motor transmits an assist torque via the clutch to the direct injection engine during a rising section of a rotation speed at a start of the direct injection engine, thereby assisting a rise in the rotation speed of the direct injection engine.

\* \* \* \* \*